United States Patent [19]
Sosalla

[11] 3,827,505
[45] Aug. 6, 1974

[54] MOUNTING CLAMP FOR SPRING TOOTH
[75] Inventor: Harry Sosalla, Sac City, Iowa
[73] Assignee: Royal Industries, Inc., Sac City, Iowa
[22] Filed: Aug. 4, 1972
[21] Appl. No.: 277,994

[52] U.S. Cl............... 172/707, 172/763, 403/395, 403/399
[51] Int. Cl............................................ A01b 23/02
[58] Field of Search ........... 172/705, 707, 708, 711, 172/762, 763, 706; 56/400; 306/1.5, 1.6; 403/395, 398, 399, 400

[56] References Cited
UNITED STATES PATENTS

| | | | |
|---|---|---|---|
| 601,504 | 3/1898 | Davison | 172/707 X |
| 609,862 | 8/1898 | Wing | 172/708 X |
| 983,894 | 2/1911 | Halve | 172/708 |
| 1,982,862 | 12/1934 | Erdman | 172/708 X |
| 2,237,002 | 4/1941 | Kelley | 56/400 |
| 2,743,657 | 5/1956 | Kriegbaum | 306/1.5 |
| 2,761,267 | 9/1956 | Hill | 172/708 |
| 3,000,448 | 9/1961 | Platt et al. | 56/400 X |
| 3,098,529 | 7/1963 | Wade et al. | 172/705 X |
| 3,150,722 | 9/1964 | Tromm | 172/707 |
| 3,223,177 | 12/1965 | Van Der Lely | 172/707 X |
| 3,618,675 | 11/1971 | Hornung | 172/707 |

FOREIGN PATENTS OR APPLICATIONS

| | | | |
|---|---|---|---|
| 74,419 | 5/1932 | Sweden | 172/707 |
| 1,120,731 | 7/1968 | Great Britain | 172/707 |
| 647,909 | 12/1928 | France | 172/705 |

Primary Examiner—Robert E. Pulfrey
Assistant Examiner—Paul T. Sewell
Attorney, Agent, or Firm—Hofgren, Wegner, Allen, Stellman & McCord

[57] ABSTRACT

A mounting clamp for a spring tooth for securing the same to the frame of a spring tooth cultivator; and a cultivator including the same. Disclosed is a U-shaped clamp having generally parallel legs spaced from each other a distance equal to the sum of the width of the frame member and the width of the mounting end of the spring tooth. The forward one of the legs includes rearwardly directed wings having a length corresponding to the width of the mounting end of the spring tooth while the bight of the clamp is provided with an elongated slot through which the mounting end may be passed to be interposed between the frame and the forward leg. The forward leg supports the mounting end throughout its entire length and thereby reducing breakage while the wings preclude pivoting of the spring tooth that would destroy the cultivating pattern.

6 Claims, 3 Drawing Figures

PATENTED AUG 6 1974 3,827,505
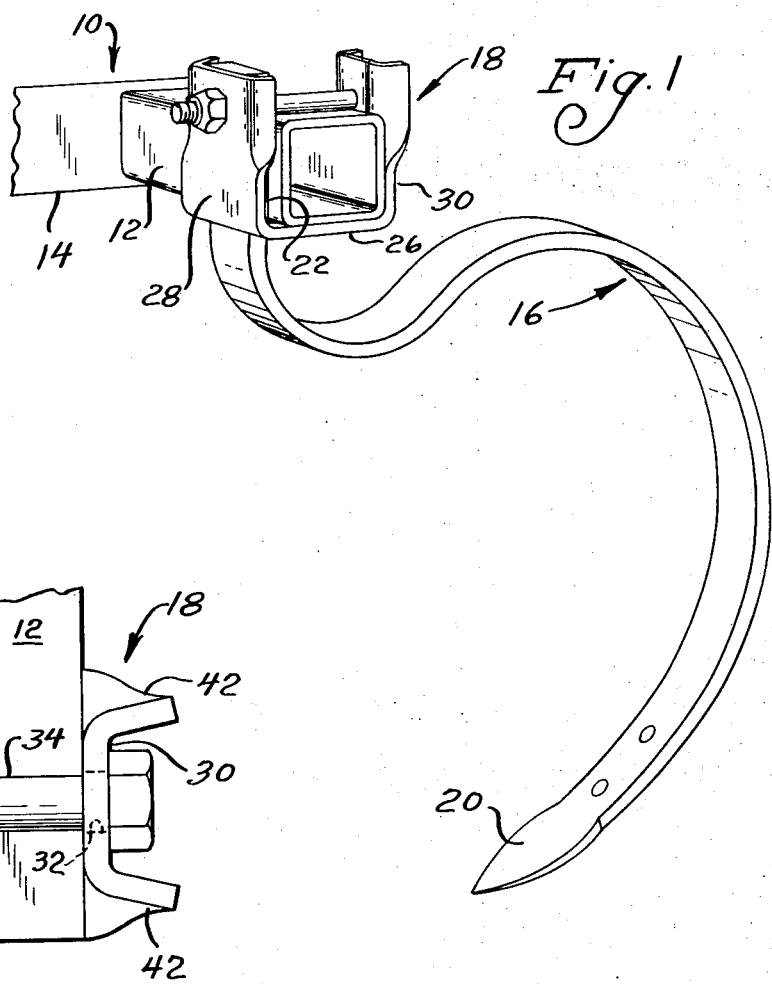
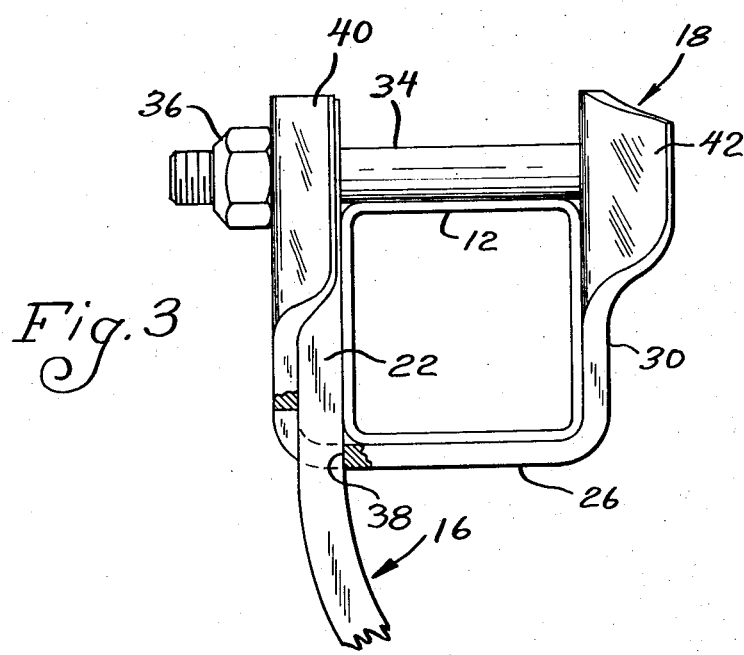

3,827,505

MOUNTING CLAMP FOR SPRING TOOTH

BACKGROUND OF THE INVENTION

This invention relates to farm implements such as spring tooth cultivators and, more particularly, to an improved mounting clamp for mounting a spring tooth to the frame of a spring tooth cultivator.

Maintenance of spring tooth cultivators has long posed a problem to farmers particularly as concerns the mounting of the individual spring teeth to the cultivator frame. The very nature of the use of such an implement is such that considerable shock is periodically applied to each spring tooth as, for example, when striking a hard object such as a rock. Frequently, the forces generated cause the spring tooth to fracture at its mounting end. The rearward force imposed upon the tooth by the encounter with the hard object results in a forwardly directed force between the conventional two points of connection to the frame, often resulting in failure at that point.

Moreover, since upon encountering a hard object, the spring tooth would tend to "work around" the object, sideways forces are applied as well. Often, one of the conventional points of connection of the mounting end of the spring tooth acts as a pivot point with the result that the tooth is deflected to one side about the pivot point and while the friction present in the mounting causes the tooth to remain in such a deflected position. The result is the destruction of the tooth pattern of a cultivator so that portions of the area to be cultivated are left untouched.

The inevitable result of use of such conventional structures is increased maintenance in terms of both replacement of fractured spring teeth and in readjustment of skewed spring teeth to the predetermined cultivating pattern desired.

SUMMARY OF THE INVENTION

It is the principal object of the invention to provide a new and improved mounting clamp for a spring tooth cultivator as well as a new and improved spring tooth cultivator employing the clamp. More particularly, it is an object of the invention to provide such a clamp that reduces breakage of the mounting end of a spring tooth when the latter encounters a hard object during use and which prevents sideways deflection of the tooth upon the same occurrence that would result in the destruction of the tooth pattern of the cultivator.

The exemplary embodiment of the invention achieves the foregoing objects with a unitary clamp formed as a U-shaped member. Preferably, the unitary member is formed from a single piece of metal plate, as by stamping.

The U-shaped clamp member includes a bight and two parallel upstanding legs which are spaced apart a distance corresponding to the sum of the width of the frame mounting member of the cultivator and the width of the mounting end of a spring tooth. The forwardmost one of the legs includes rearwardly directed wings that are spaced apart a distance approximately equal to the dimension of the spring tooth mounting end transverse to its width and the bight of the U-shaped member is provided with an elongated slot extending generally transverse to the length for receipt of the mounting end of the spring tooth. The legs are provided with aligned apertures for receipt of a bolt or the like to secure the same to the frame member.

When applied to the frame, the forwardmost leg provides reinforcing support for the entire length of the mounting end of the tooth while the wings thereon confine the mounting end to preclude pivotal movement that would result in sideways displacement of the spring tooth.

Other objects and advantages will become apparent from the following specification taken in conjunction with the accompanying drawings.

DESCRIPTION OF THE DRAWINGS

FIG. 1 is a perspective view of a portion of the frame of a spring tooth cultivator illustrating a spring tooth secured to the frame by a mounting clamp made according to the invention;

FIG. 2 is a fragmentary plan view of the assemblage with parts shown in section for clarity; and FIG. 3 is a side elevation of the assemblage, again with parts broken away for clarity.

DESCRIPTION OF THE PREFERRED EMBODIMENT

An exemplary embodiment of the invention is illustrated in the drawings and is seen to include a spring tooth cultivator frame, generally designated 10, including a cross member 12 formed of a square tube and a longitudinal frame member 14. Typically, a plurality of the frame members 14 will support a plurality of interconnecting cross members 12 on which a plurality of spring teeth are mounted at spaced locations so as to define a predetermined pattern. Such constructions are so well known that they will not be discussed in greater detail herein.

One spring tooth, generally designated 16, is seen to be secured to the cross member 12 by a clamp, generally designated 18. The spring tooth 16 will typically be in the form illustrated in FIG. 1 and include, at its lower end, a curved portion terminating in a soil engaging, work performing tool 20. The opposite end of the spring tooth 16 is a mounting end 22 which, as best seen in FIG. 2, is rectangular in cross section, and, as best seen in FIG. 3, is straight. The uppermost end of the mounting end 22 is provided with a bore 24 for purposes to be described.

The clamp 18 is a unitary U-shaped member which preferably, but need not be, formed of a single metal plate as by stamping. The same includes a bight 26, a forward leg 28 upstanding from the bight 26 and a rearward leg 30 upstanding from the bight 26 and parallel to the leg 28. The distance between the legs 28 and 30 is equal to the sum of the widths of the cross member 12 and the mounting end 22 of the spring tooth 16.

Both of the legs 28 and 30 extend upwardly from the bight 26 a distance greater than the height of the cross member 12 and each includes, near its uppermost end, an aperture 32. The apertures 32 are aligned with each other and are located on the legs such that a bolt 34 may be passed therethrough and be in substantial abutment with the upper surface of the cross member 12 as viewed in FIG. 3. The bolt 34 may be retained in such a position by a nut 36 and it will be recognized that the bolt 34 may impale the mounting end 22 of the spring tooth 16 through the aperture 24 as well.

The bight 26 is provided with an elongated slot 38 which extends transverse to the length of the bight 26. As seen in FIG. 3, a portion of the slot 38 may extend into the lower portion of the leg 28 if desired. Generally, such an extension is preferable when the clamp 18 is formed by stamping and bending so as to insure that the slot has sufficient width to receive the mounting end 22 of the spring tooth 16 as illustrated. In this respect, as viewed in FIG. 3, the right-hand edge of the slot 38 should be displaced from a vertical plane encompassing the inner surface of the leg 28 a distance approximately equal to the width of the mounting end 22 while, as viewed in FIG. 2, the length of the slot 38 should be approximately equal to the dimension of the mounting end 22 transverse to the width thereof.

The leg 28 is provided with a pair of rearwardly directed wings 40 which may be formed thereon as by bending. The wings 40 are spaced a distance approximately equal to the dimension of the mounting end 22 transverse to its width so as to substantially abut the sides of the mounting end 22. In addition, and as illustrated in FIG. 2, the length of the wings 40 should be no greater than the width of the mounting end 22 of the spring tooth 16.

Finally, the upper end of the leg 30 may be provided with rearwardly extending rigidifying means in the form of wings 42. The spacing between the wings 42 is not critical, it only being necessary that they be sufficiently far apart so as to allow the head of the bolt 34 to pass therebetween.

With reference to FIG. 3, a spring tooth 16 is mounted on the cultivator frame 10 and, specifically, the cross member 12 by orienting the clamp 18 to have its legs 28 and 30 extending upwardly. Because the length of the wings 40 is no greater than the width of a spring tooth, and the spacing between the legs 28 and 30 is equal to the sum of the widths of the cross member 12 and the mounting end 22, by moving the clamp 18 upwardly, it may pass relatively freely onto the cross member 12 to be moved to a position wherein one side of the cross member 12 is in abutment with the leg 30 while the undersurface of the cross member 12 is in abutment with the bight 26. At this point, the mounting end 22 of a spring tooth may be inserted through the slot 28 and moved upwardly between the wings 40 until the aperture 24 is aligned with the apertures 32. The bolt 34 may then be passed through the apertures 24 and 32 and the nut 36 threaded thereon sufficiently tightly to hold the same in place.

It will be recognized that the leg 28 provides support for the mounting end 22 against forwardly directed reaction forces along substantially the entire length of the mounting portion 22 to thereby preclude localized fracture. Moreover, it will be recognized that the provision of the wings 40, the spacing therebetween, and the length of the slot 38 are such as to prevent any skewing of the mounting end 22 relative to the cross member 12 by reason of sideways directed forces applied to the tool 20.

Thus, a clamp made according to the invention substantially reduces fracture of the spring tooth and precludes the same from being skewed on the frame to disrupt the tooth pattern of the cultivator. It will also be recognized that the wings 40 function as a rigidifying means for the leg 28 and in conjunction with the wings 42, which rigidifies the leg 30, insures that for even extremely large forces, those portions of the legs 28 and 30 not in abutment with the frame member 12 cannot easily be misshapen to allow partial rotation of the spring tooth 16 about the cross member 12 from the originally installed position.

It will be further recognized that the use of a unitary assembly, particularly when made from one piece by stamping and bending, provides a simple construction which may be easily placed on a cultivator frame so that by minimizing breakage and precluding skewing as well as providing for ease of installation, maintenance of spring tooth cultivators is substantially reduced.

I claim:

1. A mounting clamp for securing the mounting end of a spring tooth to a cultivator frame member comprising: a unitary U-shaped member formed from a single plate-like piece of metal by bending to have a bight and generally parallel legs extending upwardly therefrom, said legs being spaced a distance approximately equal to the sum of the widths of a mounting end of a spring tooth and a cultivator frame member on which the spring tooth is to be mounted, an elongated slot in said bight immediately adjacent one said leg and extending generally transverse to the length of said bight, said slot being sized to relatively snugly receive a spring tooth mounting end, said one leg further including side wings directed toward the other leg, said side wings being spaced from each other a distance approximately equal to the dimension of a spring tooth mounting end transverse to the width thereof and adapted to embrace the sides of a spring tooth mounting end, and a pair of apertures, one in each leg near respective ends thereof, said apertures being aligned and adapted to receive a securing means such as a bolt.

2. A mounting clamp according to claim 1 wherein said wings each have a length no greater than the width of a spring tooth mounting end whereby said clamp may be easily slipped about a frame member on a cultivator.

3. A clamp according to claim 2 wherein said other leg includes rigidifying means extending outwardly therefrom and away from said one leg.

4. A clamp according to claim 3 wherein said outwardly extending rigidifying means comprise a pair of integral wings displaced from the body of the leg.

5. A spring tooth cultivator including at least one of the clamps of claim 1, said spring tooth cultivator further including at least one generally horizontally extending frame member having a rectangular cross section, said clamp being located about said frame member with the bight thereof in abutment with the undersurface of said frame member and said other leg being in abutment with a side of said frame member; a curved spring tooth having a lower, curved end terminating in a soil working tool and an upper, generally straight mounting end extending through said slot and in abutment with said one leg and with the other side of said frame member, the sides of said mounting end further being in abutment with corresponding ones of said wings; a bolt extending through said apertures and in abutment with the upper surface of said frame member; and nut means retaining said bolt within said apertures.

6. A spring tooth cultivator according to claim 5 wherein said spring tooth mounting end includes an aperture extending therethrough, said bolt further extending through said aperture.

* * * * *